United States Patent Office 3,423,475
Patented Jan. 21, 1969

3,423,475
METHOD FOR PREPARING 2,6-DICHLORO-4-NITROTOLUENE
Leonard M. Weinstock, Rocky Hill, and Roger J. Tull, Metuchen, N.J., assignors to Merck & Co., Inc., Rahway, N.J., a corporation of New Jersey
No Drawing. Filed June 26, 1967, Ser. No. 649,042
U.S. Cl. 260—646                                    11 Claims
Int. Cl. C07c 79/12

ABSTRACT OF THE DISCLOSURE

Method for preparing 2,6-dichloro-4-nitrotoluene, an intermediate useful in preparing 2,6-dichloro-4-nitrobenzamide, a compound having anticoccidial activity. p-Nitrotoluene is chlorinated to form a mixture containing 2,6-dichloro-4-nitrotoluene plus various polychlorinated-4-nitrotoluenes. The polychlorinated compounds are subsequently treated with a reducing agent to selectively remove the chlorine attached in the position ortho to the nitro group.

BACKGROUND OF THE INVENTION (1) Field of the invention

A method for preparing 2,6-dichloro-4-nitrotoluene.

(2) Description of the prior art

The obtention of 2,6-dichloro-4-nitrotoluene by the prior art method of chlorinating p-nitrotoluene is possible only by the tedious purification of a mixture containing 2-chloro and 2,6-dichloro-4-nitrotoluene, a procedure which is rather complicated and which results in extremely poor yields.

Our invention relates to a new method for preparing 2,6-dichloro-4-nitrotoluene in high yields and in a pure state. We have found that a total of four chlorine atoms can be introduced into the ring of p-nitrotoluene. Vapor phase chromatography and magnetic resonance studies of the chlorination shows that if p-nitrotoluene is chlorinated, a mixture of 2-chloro and 2,6-dichloro-4-nitrotoluene is first formed. Continued chlorination results in an additional uptake of chlorine on the ring of these first-formed compounds so that the final mixture consists of 2,6-dichloro-4-nitrotoluene and 2,3,6-trichloro-4-nitrotoluene, and traces of 2-chloro, 2,5-dichloro, and tetrachloro-4-nitrotoluene.

The desired 2,6-dichloro-4-nitrotoluene may then be obtained in high yields and in a pure state without separation of the polychlorinated nitrotoluenes, as will hereinafter be described.

SUMMARY OF THE INVENTION

An object of the present invention is provision of a method for preparing 2,6-dichloro-4-nitrotoluene. More specifically, an object of the present invention is provision of a method for preparing 2,6-dichloro-4-nitrotoluene by chlorinating p-nitrotoluene to a controlled point and selectively reducing the polychlorinated 4-nitrotoluenes formed, having activated chlorine at the position ortho to the nitro group, to the desired 2,6-dichloro-4-nitrotoluene. Thus the process embodied in this invention involves a sequence of two steps and may be schematically represented as follows:

Step 1.—Chlorination of p-nitrotoluene

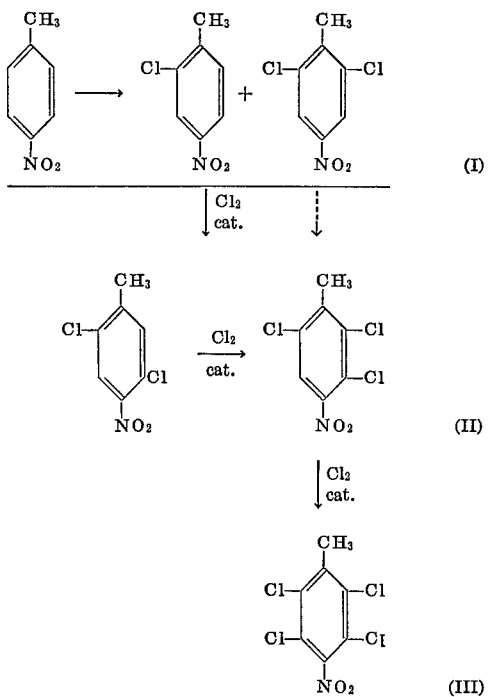

CHLORINATION OF 1.0 MOLE p-NITROTOLUENE IN PRESENCE OF MOLE 5 PERCENT SbCl₃ AT 65–70°

| Time (min.) | Moles Cl uptake | Approx. mole fraction (by VPC and NMR) | | | | |
|---|---|---|---|---|---|---|
| | | CH₃–C₆H₄–NO₂ | 2-Cl | 2,6-Cl₂ | 2,3,6-Cl₃ (and 2,5-Cl₂) | tetra-Cl |
| 77 | 0.90 | 0.117 | 0.87 | 0.013 | | |
| 102 | 1.10 | | 0.89 | 0.11 | | |
| 132 | 1.30 | | 0.68 | 0.27 | 0.05 | |
| 167 | 1.51 | | 0.48 | 0.38 | 0.10 | 0.04 |
| 202 | 1.76 | | 0.28 | 0.50 | .12 | 0.10 |
| 237 | 1.94 | | 0.16 | 0.54 | .13 | 0.17 |
| 302 | 2.2 | | 0.05 | .53 | .08 | 0.34 |
| 362 | 2.38 | | 0.02 | 0.48 | .04 | 0.46 |

Step 2.—Selective reduction of the polychlorinated-4-nitrotoluenes having activated chlorine in the position ortho to the nitro group

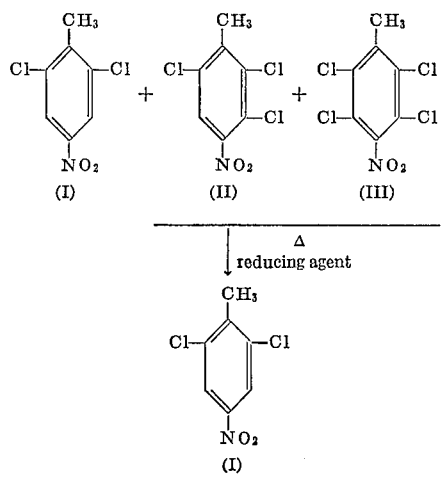

The method for preparing 2,6-dichloro-4-nitrotoluene embodied in this invention has many advantages over the prior art methods when considered in terms of ease in which the product forms and the quality and quantity of the yield obtained.

The 2,6-dichloro-4-nitrotoluene prepared according to this invention is useful in preparing 2,6-dichloro-4-nitrobenzamide, a compound having anticoccidial properties.

DESCRIPTION OF THE PREFERRED EMBODIMENTS

Step 1 may be carried out by the controlled chlorination of 4-nitrotoluene in the presence of a suitable catalyst. In using the word "controlled" it is meant that chlorination until the disappearance of the 2-chloro and 2,5-dichloro-4-nitrotoluene. At this point the mixture contains about 25% of Compound I, 70% of Compound II, and small amounts (2–4%) of Compound III.

Stated in another way, the optimum point for termination of chlorination is the minimum degree of chlorination required to reduce the concentration of 2-chloro and 2,5-dichloro-4-nitrotoluene to less than 1%. Thus, both underchlorination and excessive overchlorination are undesirable as the presence of large amounts of 2-chloro and 2,5-dichloro-4-nitrotoluene will reduce the yield of the desired 2,6-dichloro-4-nitrotoluene formed as well as the amount of 2,3,6-trichloro-4-nitrotoluene, which can later be selectively reduced. Overchlorination resulting in the formation of excessive amounts of tetrachloro-4-nitrotoluene will require excess amounts of reducing agents, which may have a tendency to increase the reduction of the nitro group. The degree of chlorination can be determined by vapor phase chromatographic analysis during the reaction period.

The p-nitrotoluene may be effectively chlorinated using gaseous chlorine.

A preferred catalyst that may be employed in the chlorination step is antimony trichloride, although other agents such as ferric chloride, iron filings and silver chloride sulfuric acid mixture may also be used.

The amount of catalyst or the temperature at which the chlorination is carried out is not critical and will not affect the composition of the reaction mixture at any given increment of chlorine absorbed, although varying either will tend to affect the rate of reaction. The temperature at which the chlorination step is effected if a solvent is used will most usually vary between 20° to the reflux temperature of the solvent, preferably between about 65–70°. When chlorination is effected in the absence of a solvent, the preferred temperature range is also about 65–70°, however, temperatures as low as 54° and as high as 90° are satisfactory. Generally the reaction initially will be exothermic and sufficient to maintain the reaction temperature throughout most of the chlorination period.

Although solvents such as carbon tetrachloride or chloroform may be used, for maximum yields it is preferred to effect chlorination in the absence of a solvent using anhydrous reactants.

Step 2 involves the selective reduction of the polychlorinated-4-nitrotoluenes formed in step 1 having activated chlorine atoms in the position ortho to the nitro group (Compounds II and III) to form the desired 2,6-dichloro-4-nitrotoluene (Compound I) plus some small amounts of toluidines which result from the reduction of the nitro groups of Compounds I and II.

The reduction is effected by heating the mixture obtained from step 1 with a reducing agent and a proton donor. The toluidines formed along with the desired 2,6-dichloro-4-nitrotoluene may be easily removed from the reaction mixture by acid treatment.

The time, temperature, and the selection of the reducing agent and an appropriate proton donor in the reducing step are factors which will determine to a great extent whether the reduction of the activated chlorines will be complete or whether excess reduction of the nitro group will take place.

A suitable reducing agent is one that will effect reduction of the activated chlorine atoms rather than the nitro group. A preferred reducing agent that will effectively accomplish this is metallic copper, although copper oxide may also be used. As a proton donor, agents such as benzoic acid, water, and acetic acid may be used.

The amount of reducing agent will vary from a minimum of about 1.85 moles/mole of reducible chlorine to about 6.8, depending upon the reducing agent and proton donor used. Amounts less than 1.85 moles result in incomplete reduction of the reducible chlorine atoms.

The reaction time will vary from 10 minutes to 21 hours, depending upon the reducing agent and the proton donor utilized. Extending the reaction time may result in complete reduction of the nitro group rather than the activated chlorines, or reduction to such an extent as to decrease the yield. Shortening of the reaction time, on the other hand, will result in incomplete reduction of the activated chlorines and also decrease the yield.

The temperature at which step 2 is performed will vary between 120° and 190°, depending upon the reducing agent and proton source used, as well as the length of the reaction time.

A preferred embodiment of Step 2 is to treat the polychlorinated nitrotoluenes obtained from Step 1 with powdered copper using glacial acetic acid as a proton donor, and heating the mixture to about 119–145° C. for about 18 to 21 hours. The use of a small amount of solvent to fluidize the polychlorinated nitrotoluenes prior to treatment with the reducing agent will not only permit the use of smaller amounts of the reducing agent, but also increase significantly the final yield of the desired 2,6-dichloro-4-nitrotoluene. Suitable solvents include chlorobenzene, dichlorobenzene, xylene, anisol or mesitylene, chlorobenzene being preferred.

The 2,6-dichloro-4-nitrotoluene prepared according to this process may be used to prepare 2,6-dichloro-4-nitrobenzamide by treating the former with nitric acid and subsequently reacting the 2,6-dichloro-4-nitrobenzoic acid thus formed with phosgene in the presence of a catalytic amount of dimethylformamide. The acid chloride thus formed can then be reacted in a benzene solution with ammonia to form 2,6-dichloro-4-nitrobenzamide.

The following examples are given for the purpose of illustration, and not by way of limitation.

EXAMPLE 1

Step I.—2,6-dichloro-4-nitrotoluene

CHLORINATION OF p-NITROTOLUENE

Gaseous chlorine is bubbled at a rate of about 1.2 g. per minute into a tared 500 ml. three necked flask equipped with a mechanical stirrer, thermometer, gas inlet tube and drying tube, containing 0.50 mol (68.5 g.) of p-nitrotoluene and 0.05 mole (11.4 g.) of dry antimony trichloride. The temperature of the moderately exothermic reaction is maintained at 65–70° during the chlorination. When the reaction charge has increased in weight by 53 g. (about three hours), vapor phase chromatographic analysis indicates the presence of 70% 2,3,6-trichloro-4-nitrotoluene, 25% of 2,6-dichloro-4-nitrotoluene and 5% or less of tetrachloro-4-nitrotoluene. 50 ml. of water is then added and the mixture is stirred at 70° for twenty minutes. 100 ml. of benzene is added and the mixture is filtered, and the precipitate washed with benzene. The yellow benzene layer in the filtrate is removed and the aqueous layer washed with benzene. The combined benzene extracts are then dried over magnesium sulphate and evaporated in vacuo to dryness to yield a mixture of chlorinated nitrotoluenes consisting of 2,6-dichloro (70%), 2,3,6-trichloro (25%), and tetrachloro-4-nitrotoluene (4–5%).

When the procedure of Step 1 above is repeated at 20° C. using 0.05 mole of ferric chloride or iron filings and chloroform or carbon tetrachloride as a solvent, similar yields of the polychlorinated nitrotoluenes will be obtained.

Step II.—Reduction of mixed chloronitrotoluenes

The mixture obtained in the chlorination above (118–120 g.) is mixed with 240 g. of benzoic acid in a one liter three necked flask equipped with a mechanical stirrer, a thermometer, and covered with a slow moving blanket of nitrogen. The mixture is heated to 167–170°, and 160 g. of electrolyte grade copper powder is added over a ten minute period and the mixture maintained at 167–170° for an additional ten minutes. The reaction mixture is then cooled to 100° and 300 ml. of water and 200 ml. of benzene are added. 140 g. of potassium carbonate is added in small increments at room temperature in order to neutralize the benzoic acid. The solids are filtered, and the solid residue is washed twice with benzene. The yellow to green benzene layer in the filtrate is removed and washed with 150 ml. of saturated sodium bicarbonate. The water and bicarbonate extracts are washed with 100 ml. of benzene. The combined benzene extracts are shaken well with 150 ml. of concentrated hydrochoric acid and the precipitated toluidine hydrochloride by-products are filtered and washed with benzene. The layers in the filtrate are separated and the aqueous acid layer is washed with benzene. The combined benzene extracts are dried over magnesium sulphate and evaporated in vacuo to yield 76.7 g. (74.5%) of 2,6-dichloro-4-nitrotoluene, M.P. 59–62°, which is 97–99% pure by V.P.C.

When the procedure of Step 2 above is repeated using water as a proton donor, and the reaction mixture is heated for 18 hours at 160°, the yield of 2,6-dichloro-4-nitrotoluene is 50%.

EXAMPLE 2

Reduction of mixed chloronitrotoluenes

To 18.8 g. of the chlorinated 4-nitrotoluenes obtained in Example 1, Step 1, is added 10 ml. of chlorobenzene, 5.85 ml. of glacial acetic acid and 7.3 g. of powdered metallic copper. The mixture is then heated to reflux for a period of 21 hours, during which time the temperature of the reaction mixture gradually rises from 119° C. to 145° C. After cooling, 10 ml. of water is added to the mixture and the chlorobenzene is removed by steam distillation. 50 ml. of benzene is filtered to remove any inorganic insolubles. The insoluble residue is washed with benzene and the two filtrates are combined. The benzene layer of the 2-phase filtrate is removed and shaken with 25 ml. of concentrated hydrochloric acid, and the mixture is filtered to remove any toluidines present. The benzene layer of the resulting 2-phase filtrate is washed with water and evaporated to dryness to yield 15.5 g. (91%) of 2,6-dichloro-4-nitrotoluene.

When the procedure of Example 2 is repeated using xylene, dichlorobenzene, anisol or mesitylene as a solvent, 2,6-dichloro-4-nitrotoluene in amounts similar to those stated above may be obtained.

EXAMPLE 3

2,6-dichloro-4-nitrobenzamide

A mixture containing 5 g. of 2,6-dichloro-4-nitrotoluene, 8 ml. of 70% nitric acid and 11.5 ml. of water is sealed in a glass tube and heated for 16 hours at 160° with shaking. The tube is then cooled with Dry Ice, opened, and the pressure released The mixture is then warmed to room temperature and diluted with 20 ml. of water and extracted twice with 35 ml. portions of chloroform. The chloroform extracts are then twice extracted with 25 ml. portions of a saturated solution of sodium bicarbonate and the resulting alkaline extract made acidic with hydrochloric acid to yield 2,6-dichloro-4-nitrobenzoic acid, having a M.P. of 170–172° C.

A mixture containing 1.8 g. of 2,6-dichloro-4-nitrobenzoic acid, 5 ml. of benzene and 0.4 ml. of dimethylformamide is stirred at 25° C. Phosgene is passed into the mixture for ½ hour during which time the temperature rises to 35° and then starts to fall. After an additional 15 minutes of stirring, the excess phosgene is removed under reduced pressure and the mixture is treated with 2 ml. of concentrated ammonia with vigorous stirring at 10° C. After 15 minutes the resulting thick slurry is filtered and the precipitate is washed with water and dried to yield 2,6-dichloro-4-nitrobenzamide, M.P. 191–193° C.

We claim:
1. The method for preparing 2,6-dichloro-4-nitrotoluene which comprises the steps of
    (a) chlorinating p-nitrotoluene in the presence of a catalyst to form a mixture of chlorinated 4-nitrotoluenes consisting predominantly of 2,6-dichloro and 2,3,6-trichloro-4-nitrotoluene and minor amounts of tetrachloro-4-nitrotoluene,
    (b) heating the resulting mixture of polychlorinated-4-nitrotoluenes with a reducing agent in the presence of a proton donor to remove the chlorine atoms in the position ortho to the nitro group.
2. The method of claim 1 wherein step (a) is effected using anhydrous reactants.
3. The method of claim 1 wherein the mixture in step (b) is heated to a temperature of about 120° to about 190°.
4. The method of claim 2 wherein the catalyst in step (a) is antimony trichloride.
5. The method of claim 4 wherein the mixture in step (b) is heated to a temperature of about 120° to 190° and the proton source is benzoic acid, water, or acetic acid.
6. The method of claim 4 wherein the mixture in step (b) is heated to temperature of about 145° to about 170°, and the reducing agent is metallic copper and the proton donor is benzoic acid or acetic acid.
7. The method of claim 6 wherein the proton donor is acetic acid and the reaction mixture is heated to a temperature of about 145°.
8. The method of claim 7 wherein the polychlorinated-

4-nitrotoluenes in step (b) are first contacted with a solvent.

9. The method of claim 8 wherein the solvent is chlorobenzene, dichlorobenzene, xylene, or mesitylene.

10. The method of claim 9 wherein the solvent is chlorobenzene.

11. 2,3,6-trichloro-4-nitrotoluene.

References Cited

Beilstein's Handbuch der Organischen Chemie, Vierte Auflage, Drittes Erganzungswerk, pp. 748 to 753 (1964).

Dictionary of Organic Compounds, vol. 2, Eyre and Spottiswoode, London, 1965, pp. 989 and 990.

LELAND A. SEBASTIAN, *Primary Examiner.*